UNITED STATES PATENT OFFICE 2,670,499

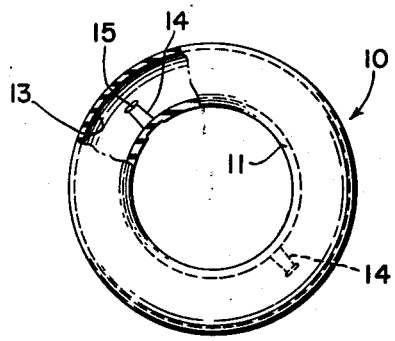
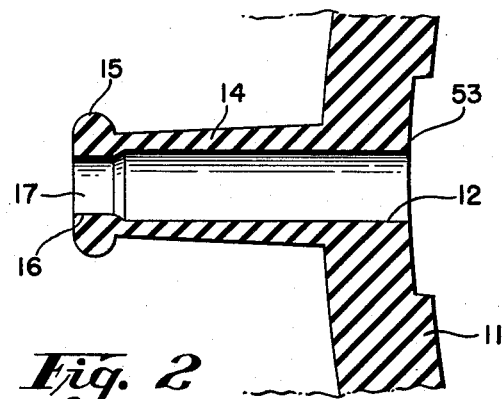
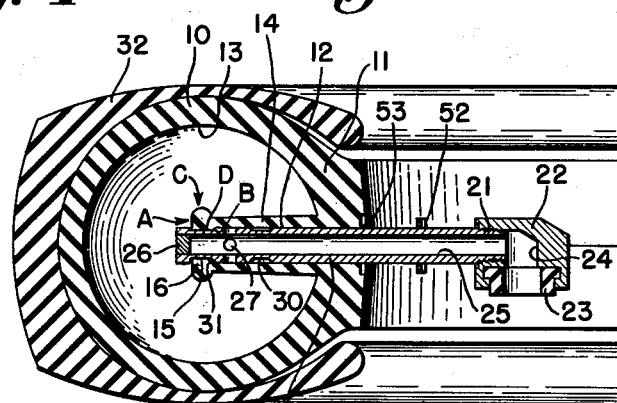
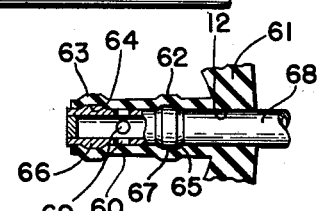
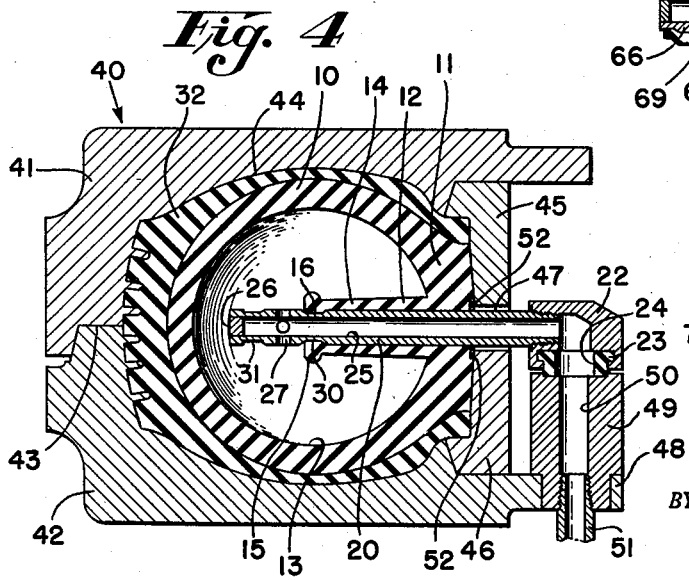

CONNECTING AND SEALING MEANS FOR CURING BAGS

Harold Weigold, Grosse Pointe Woods, and Joseph C. Andreini, Detroit, Mich., assignors to United States Rubber Company, New York, N. Y., a corporation of New Jersey Application September 20, 1950, Serial No. 185,754

2 Claims. (Cl. 18—45)

This invention relates to pneumatic tire shaping and vulcanizing apparatus and more particularly it relates to improved connecting and sealing means for curing bags for pneumatic tires.

In the manufacture of pneumatic tires, it is conventional practice first to assemble the component parts of the tire, such as the inextensible bead elements, the carcass portion and the tread and sidewall portions, in band form, on a building drum, and thereafter to shape the tire with the aid of the curing bag, which is a hollow toroidal form having relatively thick walls of heat-resistant, extensible, resilient material, usually made of a natural rubber composition or of a synthetic rubber, such as butyl rubber. The curing bag has one or more inlets for introduction of fluid shaping and heating media under pressure, such as air, hot water or steam, and such fluid media are used to apply internal pressure to expand the bag against the tire and to make the latter conform to the shape of the heated mold in which the tire is vulcanized, as well as to heat the tire internally to effect more rapid and more uniform vulcanization.

The inlet means for introduction of the fluid medium to the interior of the curing bag is usually a metal stem extending through the wall of the bag. In the past it has not always been possible to maintain such stem in tight, fluid-sealing relation with the wall of the curing bag, due to the difficulty of forming and maintaining a good adhesive bond between the metal stem and the rubber composition from which the bag is made. This difficulty is aggravated by the exposure of the bag and stem to high temperatures and pressures and to corrosive conditions during the vulcanization of the tire, as well as by the mechanical abuse to which the curing bag is subjected when it is inserted in the tire, and later removed therefrom, these operations requiring extreme twisting of the bag and rough pushing of the twisted bag into place.

As a result, the curing bag stem sometimes develops leaks, rendering the bag useless, and resulting in a defective or totally spoiled tire if the leak is not discovered before the tire is placed in the vulcanizing mold.

Accordingly, it is an object of the present invention to provide an improved connecting and sealing means for introduction of fluid media under pressure into a curing bag.

Another object of the invention is to provide a connecting and sealing means for curing bags which is essentially independent of any rubber-to-metal adhesive bond.

Still another object is the provision of a curing bag having increased service life and capable of withstanding considerable mechanical abuse.

A further object is the provision of a curing bag connecting means which functions either as a means for introducing a fluid medium, or as a means for sealing the curing bag inlet against passage of a fluid medium.

Still a further object is to provide means for selectively positioning a curing bag connection either in position for introducing fluid to the bag, or in position for sealing the bag inlet against passage of fluid, such means acting to maintain the connection in either position during handling of the bag and processing of the tire.

Additional objects of the invention are to provide a resilient curing bag sealing means that has long life and to provide a sealing means that is readily removable from the bag.

These and other objects and advantages of the invention will be made evident in the following detailed description when read with reference to the accompanying drawing, wherein Fig. 1 is a plan view, with parts broken away, of a curing bag having internal sealing stems constructed according to the invention;

Fig. 2 is an enlarged sectional view of one of the internal sealing stems of the curing bag;

Fig. 3 is a transverse sectional view of the curing bag on an enlarged scale, in position within a raw tire casing, and showing an insertable sliding connecting tube in place in sealing position within the internal sealing stem;

Fig. 4 is a transverse sectional view of the curing bag and tire casing in place in a vulcanizing mold, showing the sliding connecting tube moved into position for introduction of a fluid medium; and Figs. 5 and 6 are fragmentary views, partly in section, of modified forms of sealing stems with modified connecting tubes inserted therein.

Referring to the drawing, the curing bag 10 shown therein comprises an annular toroidal inflatable tube which is adapted to be placed inside a pneumatic tire casing for the purpose of shaping the tire and causing the tire to conform to the walls of the mold cavity in which it is vulcanized. The bag 10 is made of extensible resilient material, preferably a synthetic rubber of the type that is highly resistant to the deteriorating effects of repeated exposure to vulcanizing temperatures. Butyl rubber, that is, a rubbery copolymer of isobutylene with a conjugated 1,3-diene, such as butadiene or isoprene, is especially suitable for this purpose because of its resistance to "reversion," or over-cure upon repeated exposure to high temperatures, as well as its resistance to oxidation and its dimensional stability at elevated temperature.

The inner diameter or rim area 11 of the bag is relatively thick and, as shown in Figs. 3 and 4, is so shaped as to maintain the beads of the tire casing with which it is associated in proper contact with the tire mold parts during vulcanization.

For the purpose of introducing a fluid expanding medium under pressure, there are provided one or more inlet passageways 12 through the rim wall 11 of the bag. Extending into the interior cavity 13 of the bag there is provided a stem or projection 14 forming a continuation of the inlet passageway 12. This stem is also made of extensible resilient material, and is usually made of the same material as the bag body itself, and is integrally united to the bag body, suitably by compression molding, as is disclosed in co-pending application of Jake Hengeveld, Serial No. 67,430, filed December 27, 1948, and assigned to the same assignee as the instant application. The wall of the stem 14 is relatively thick at its base where it is integral with the curing bag wall, and tapers inwardly to a lesser thickness toward the tip of the stem. The end or tip of the stem 14 is provided on its outer surface with a radially outwardly extending thickened rim or lip 15 for the purpose of reinforcing the stem at this point, thereby preventing the stem from enlarging upon continued use and thereby increasing the useful service life of the bag. The interior tip of the stem is also provided with a radially inwardly extending thickened rim or lip 16, thereby providing a restricted passageway 17 at the terminal end of the inlet passageway 12. The purpose of this inward annular projection 16 is to provide a sealing and holding action in cooperation with a rigid slidable connecting tube 20 insertable in the inlet passage 12.

The rigid connecting insert tube 20 has an outside diameter such that it slides snugly within the passage 12, in fluid-sealing engagement with the wall thereof, and it may be inserted into and removed from such passage by hand. The outer end of the insert tube 20 is provided with a threaded portion 21 onto which is threaded an elbow coupling member 22 carrying a resilient sealing gasket 23 on its outer face. A passageway 24 through the gasket 23 and elbow 22 connects with a longitudinal passageway 25 extending through the insert tube 20. At the inner end of the tube 20, the passageway 25 is sealed off by means of a tight-fitting plug 26 inserted therein.

Spaced from the inner end of the tube 20, radial inlet holes 27 leading from the passageway 25 are provided. On each side of the inlet holes 27, and spaced somewhat therefrom, there is provided an annular recess or depression 30 or 31 on the outer surface of the tube 20. The recesses 30 and 31 are adapted to receive the inner annular resilient lip 16 of the stem 14 forming a fluid tight seal therewith, and either of such recesses is selectively engageable with the lip 16 by sliding the insert tube inwardly or outwardly as desired. Frictional interlocking of the lip 16 with either of the recesses 30 and 31 also serves to maintain the insert tube 20 in a desired position with respect to the stem 14, as will be explained in more detail below.

In Fig. 3, the bag 10 is shown in place within a raw tire casing 32 which has previously been built in the form of an annular band on the usual tire building drum, and shaped into the annular toroidal form shown with the aid of a vacuum shaping box, wherein the bag 10 is inserted in the casing 32 and inflated with air, all in accordance with conventional practice. The insert tube 20 is shown in Fig. 3 in the outermost position, with the recess 31 in engagement with the internal resilient lip 16, in which position the radial inlet holes 27 are located within the passageway 12 inside the resilient stem 14. In this position the inlet holes 27 are sealed off from the interior cavity 13 of the curing bag 10 by the resilient walls of the stem 14, and especially by the internal annular resilient lip 16 of the stem 14, which is pressed into tight sealing engagement with the recess 31 by the pressure of fluid, in this case the air used to inflate the bag in shaping the tire, acting on the relatively large outer surface area of the resilient stem 14. The outer lip 15 on the tip of the stem 14 increases the outer surface area on which the pressure of the fluid in the bag acts, thereby further improving the seal. Thus, fluid pressure acting axially of the stem against the tip thereof, as indicated by the letter A in Fig. 3, causes a sealing pressure to be exerted by the side of the internal lip 16 against the side of the cavity 31, at the area indicated by the letter B. At the same time, fluid pressure acting radially of the stem as indicated by the letter C causes a sealing pressure to be exerted against the face area of the recess 31, as indicated by the letter D. The air used in shaping the raw tire 32 is thereby retained in the bag 10, keeping the tire in proper shape while it is being transported from the place at which it was shaped, and while awaiting enclosure in the vulcanizing mold. The interlocking of the lip 16 with the recess 31 prevents the tube 20 from being blown out of the bag by the internal air pressure therein.

In Fig. 4, the curing bag 10 and tire casing 32 are shown in place in a vulcanizing mold 40. The mold 40 comprises upper and lower mating mold halves 41 and 42, separable at a parting line 43. The mold halves 41, 42 together define an annular toroidal cavity 44 having the proper shape for accommodating the tire. The assembly includes annular toe rings 45, 46 which in cooperation with the curing bag 10 and the mold halves 41, 42 aid in maintaining the beads of the tire casing in place, and aid in imparting the desired shape thereto. It will be understood that the mold halves 41, 42 are enclosed by a suitable press (not shown) adapted to apply pressure and heat thereto. Recesses in the marginal edges of the toe rings 44, 45 define a port 47 through which the insert tube 20 passes freely.

As shown in Fig. 4, the insert tube 20 is in the innermost position with the recess 30 nearest the outer end of the tube 20 in engagement with the inner resilient lip 16, in which position the radial inlet holes 27 are located within the internal cavity 13 of the curing bag 10, and fluid supplied through the passageway 25 therefore has access to the interior of the bag. In this position the passageway 12 leading from the bag is sealed off by pressure of the resilient wall of the stem 14 against the insert tube 20, and especially by the pressure of the inner lip 16 against the recess 30 provided in the outer wall of the tube 20, so that fluid cannot leak out of the bag.

For the purpose of connecting the coupling elbow 22 of the insert tube 20 to a supply of fluid pressure (not shown) an inwardly extending flange 48 of the lower mold half 42 is provided with an upstanding coupling member 49, having an internal passageway 50, into the bottom of which a fluid supply line 51 is threaded. The upper face of the coupling 49 bears against the resilient gasket 23 on the lower face of the elbow 22 in tight sealing engagement therewith, thereby connecting the inlet passage 50 to the passage 24 within the elbow.

It will be understood that this coupling arrangement is duplicated at each side of the inner rim of the mold, to provide for connecting tubes 20 in each of the internal sealing stems 14, shown in Fig. 1.

When the bag 10 is expanded by internal fluid pressure, the tire casing 32 and curing bag 10 fill out the mold cavity 43 entirely in pressurized contact with the interior walls thereof. The rim portion 11 of the curing bag presses against the inner faces of the toe rings 45, 46. A transverse plate 52 secured to the stem 20 in such a position that it bears against the outside of the rim wall 11 of the curing bag when the tube is in inlet position, serves to prevent the curing bag rim wall, which becomes relatively soft at vulcanizing temperatures, from being displaced outwardly through the port 47 in the toe rings 45, 46 under the influence of the internal pressure in the bag. A slight recess 53 is provided in the outer rim face of the bag to accommodate the plate 52.

In operation, the curing bag 10, in a deflated condition and containing no insert tubes 20, is inserted in the tire casing 32 as the latter is being shaped in the usual vacuum shaping box. In the course of this operation the curing bag is very much twisted and is pushed roughly into place with a hydraulic plunger. When the bag 10 is in place in the casing 32, insert tubes 20 are slid into position in the inlet passageways 12 of the bag within the resilient stems 14. One of such tubes is located at the inner position or "inlet position" with the radial inlet holes 27 inside the cavity 13 of the bag, and with the inner recess 30 in engagement with the inner sealing lip 16. In this position the plate 52 is in engagement with the recess 53 in the outside of the rim wall 11 of the tube, and such plate serves as a guide to the operator in determining that the insert tube is in the correct "inlet position." The remaining insert tube is located in "sealing position" with the radial inlet holes 27 inside the resilient stem 14 and the outer annular recess 31 in engagement with the sealing lip 16. The operator is able to determine readily when the tube is in sealing position, since he can feel the inlet tube resist further movement when the lip 16 engages the recess 31. An air line (not shown) is then connected to the elbow 22 of the insert tube which is in inlet position and the bag 10 is inflated to further shape the tire casing 32. After the bag is inflated with air the insert tube 20 through which the air was introduced is withdrawn to sealing position, as indicated in Fig. 3, that is, the tube is withdrawn until the radial inlet holes 27 are within the resilient stem 14, and the lip 16 is in sealing engagement with the inner recess 31. The air line is then disconnected and the tire casing containing the bag may be transported to the molding presses and inserted therein without distortion since the casing is maintained in shape by the inflated bag.

Each inlet tube 20 is then slid inwardly in the stem 14 to inlet position, with the radial inlet holes 27 inside the bag cavity 13, and the casing and bag are placed in the press, as indicated in Fig. 4. In this position the elbow 22 of the stem 20 engages the coupling member 49 of the mold 40, and hot water may be introduced into the cavity of the bag from the supply tube 51 through inlet passageways 50, 24 and 25 in the coupling and insert tube 20. Usually the insert tube 20 at one side of the bag is used to introduce the hot water, while the insert tube on the opposite side of the bag is used as an exit, so that the water may be circulated through the bag as desired. The water is introduced at the proper temperature to effect the desired vulcanization of the tire, and at the same time the mold 40 is heated externally by heating means contained within the press (not shown) in the usual manner.

At the conclusion of the vulcanization cycle the insert tube 20 may be utilized as a draining means to provide for the necessary removal of the water before the mold is opened. In the type of press known as the DeMattia press, wherein the mold assembly is disposed in a plane inclined at an angle to the horizontal, draining is accomplished by connecting the insert tube 20 located at the lower side of the mold assembly to a drain line, while steam or air is introduced through the insert tube 20 located at the higher side of the mold, thereby driving the greater portion of the water out through the lower tube.

In the type of press known as the dome type vulcanizer, drainage may be accomplished by opening the insert tube 20 to the atmosphere, thereby releasing the internal pressure within the bag, whereupon the steam within the press will enter between the cured tire casing and the curing bag, thus collapsing the bag and forcing the water out through the insert tube 20.

The mold is then opened and the vulcanized tire casing containing the bag is removed and transported, with the insert tube 20 still in place, to the location where the bag is removed from the vulcanized tire. The bag is pulled from the tire casing, and the bag may then be made ready for insertion into another raw tire casing as described previously. This cycle is repeated until the bag has deteriorated from repeated exposure to vulcanizing conditions, to the point where the bag is no longer useful.

In the modification of the invention shown in Fig. 5, a resilient sealing stem 60 extends into the cavity of a curing bag 61, in the same manner as described above in connection with the stem 16 and bag 10. The modified stem 60 has two longitudinally spaced external reinforcing lips or projections 62 and 63. The interior of the stem is provided with two longitudinally spaced annular recesses 64 and 65 adapted to cooperate with annular spaced projections 66 and 67 on the modified rigid inlet tube 68. The tube 68 has radial inlet holes 69 and is adapted to be selectively positioned either in sealing position with the inlet holes 69 sealed within the stem 60 as illustrated in Fig. 5, or in inlet position with the holes 69 within the cavity of the bag 61. In either of these positions the internal recesses 64 and 65 within the stem 60 and the projections 66 and 67 on the insert tube 68 cooperate to maintain the tube in position and to effect a seal against leakage of fluid, as described in connection with the form of the invention illustrated in Figs. 1 to 4.

A further modification, illustrated in Fig. 6, embodies a rigid insert tube 70 having a helical groove 71 on its external surface adapted to engage a segmental helical rib 72 formed on the interior wall of the sealing stem 73. The insert tube 70 is shown in sealing position with the inlet openings 74 within the bore of the stem 73. In this form of the invention, movement of the stem from sealing position to inlet position is effected by rotating the tube 70. During rotation, engagement of the helical rib 72 with the helical groove 71 causes longitudinal movement of the insert tube to uncover the openings 74.

From the foregoing it will be evident that the invention provides a resilient curing bag stem having an internal passageway therethrough, the walls of said passageway having portions offset, radially of the stem, from the principal portions of such wall, and such offset portions may take the form, for example, of projections, such as the circular rib 16 or the helical rib 71, or of recesses, such as the circular recesses 64 and 65.

It has been found in actual factory practice that the invention makes it possible to use the curing bag for a greater number of curing cycles than has heretofore been considered practical. Consequently, the cost of manufacturing the tires has been reduced, since the curing bag represents an appreciable item of expense in tire manufacture. In addition, the number of defective tires obtained when using the invention has been observed to be less than the number of defects produced using previously known stems. This is because the present sealing means is highly effective, preventing leaks which sometimes occur with conventional stems. The importance of this feature will be appreciated when it is considered that even a relatively slight leakage of fluid during the vulcanizing operation may result in a defective tire.

By providing the relatively heavy reinforcing lip 15 on the outer tip of the internal resilient sealing step 14, it is found that any tendency of the stem passage 12 to enlarge with continued use is counteracted. Such enlargement of the stem passageway, consequent upon repeated insertion therein of an insert tube which expands the stem passageway slightly each time, has heretofore been a limiting factor on the number of cycles for which the curing bag could be used without leaking. The outer lip also serves to increase the external area of the stem at the tip, thereby increasing the effectiveness of the internal fluid pressure in the bag as a sealing agent.

The provision of a removable insert tube, such as tube 20, capable of being selectively placed in either an inlet position or a sealing position, makes for simplicity and convenience of operation. Formerly it had been considered necessary to provide a separate solid sealing stem for the purpose of sealing the bag in the inflated condition after shaping the tire casing with air pressure as described above. Such separate sealing stems not only represented an additional item of equipment but required an extra operation and thereby added to the time and labor cost for producing the tire.

Because of the facility with which the insert tube is movable from sealing position to inlet position, the operator is enabled to very quickly prepare the curing bag for introduction of the vulcanizing fluid when the air-inflated bag and tire casing are placed in the vulcanizing mold. Therefore, the length of time for which the operator has to manipulate the tire assembly at the vulcanizing mold, which is of course very hot, is reduced, making for more satisfactory working conditions, as well as for economy.

Because the insert tube is adapted to certain types of draining operations, as explained above, the insert tube may be left in the bag inlet during and after draining, as well as while the curing bag and tire are being transported to the station at which the bag is removed from the tire. Therefore it is not necessary to make any provision for the removal of the insert tubes when the tire mold is opened, nor is it necessary to provide for separate transportation for the tubes back to the location where the bags are inserted in another raw tire.

At the same time, the easy removability of the insert tubes is highly advantageous, for the tubes can be taken out of the bag before the bag is inserted in the raw tire. This eliminates a source of injury to the bag, since bags containing integral united inlet tubes are sometimes injured when the bag is roughly handled or twisted, causing the rigid tube to sink into or bruise the bag wall. The present insert tube need not be put in place until after the bag is inserted in the tire casing, thus avoiding this difficulty.

The fact that the insert tube is removable is also advantageous in that the tube can be readily inspected for clogging, corrosion or other defects, and, if necessary it is easily cleaned or repaired. With conventional rigidly attached inlet tubes which cannot be inspected, the first indication that the tube is clogged or defective may not come until defective tires are produced. Also, such stems cannot be cleaned readily, or repaired without destroying the bag.

Although the insert tube is easily removable, it nevertheless remains securely in place in either the sealing position or the inlet position as desired, due to the manner in which the tube cooperates with the resilient bag stem, so that there is no danger of the tube falling out as the tire is being transported or handled.

Because of the way in which the curing bag is sealed against leakage by a resilient stem making pressurized contact with a removable rigid insert tube, the sealing of the bag is independent of any rubber-to-metal bond. The dependence upon a permanent rubber-to-metal bond, as in certain conventional curing bag stems, is a serious limitation on the life of the curing bag because such bond tends to deteriorate under the influence of high temperature and mechanical abuse, causing the bag to leak.

Having thus described our invention what we claim and desire to protect by Letters Patent is:

1. A curing bag assembly for manufacture of pneumatic tires comprising a hollow annular toroidal inflatable bag of extensible resilient material, said bag having an inlet opening, an inwardly projecting stem of extensible resilient material extending into the interior of the bag from said opening, and having a passageway therethrough forming a continuation of said opening, said stem being integral with said bag, and a radially inwardly extending lip on the inner surface of said stem, said inwardly extending lip forming a restriction in said passageway, a sealing and connecting tube passing through said passageway in sliding engagement with the interior walls thereof, said tube also having a passageway therethrough, an outlet from said passageway in said tube spaced from the end of said tube, said tube having near its end an annular recess on each side of said outlet, said annular recesses being selectively engageable with said inwardly extending lip to provide a seal therewith when the tube is positioned in said stem passageway, and means for connecting said tube to a fluid supply source.

2. A curing bag assembly for manufacture of pneumatic tires comprising a hollow annular toroidal inflatable bag of extensible resilient material, said bag having an inlet opening, an inwardly projecting stem of extensible resilient material extending into the interior of the bag from said opening, said stem having a passageway therethrough forming a continuation of said opening, said stem being integral with said bag, a sealing and connecting tube passing through said passageway in sliding engagement with the interior walls thereof, said tube also having a passageway therethrough, an outlet from said passageway in said tube spaced from the end of said tube, the inner surface of said stem and the outer surface of said tube being provided with a cooperating interfitting arrangement comprising an annular lip extending radially from one said surface and an oppositely disposed annular recess extending radially into the other of said surfaces, said lip fitting into said recess to provide a seal between the stem and tube when the tube is positioned in said stem passageway, and means for connecting said tube to a fluid supply source.

HAROLD WEIGOLD.
JOSEPH C. ANDREINI.

References Cited in the file of this patent

UNITED STATES PATENTS

| Number | Name | Date |
|---|---|---|
| 1,041,216 | Woods | Oct. 15, 1912 |
| 1,397,220 | Lord | Nov. 15, 1921 |
| 1,630,040 | Vogt et al. | May 24, 1927 |
| 1,694,872 | Van Rennes | Dec. 11, 1928 |

FOREIGN PATENTS

| Number | Country | Date |
|---|---|---|
| 29,040 | Great Britain | Dec. 17, 1912 |
| 32,571 | France | Feb. 14, 1928 |